(12) United States Patent
Denney et al.

(10) Patent No.: US 7,483,956 B2
(45) Date of Patent: Jan. 27, 2009

(54) E-MAIL TO PHYSICAL MAIL CONVERTER

(75) Inventors: Michael James Denney, Byron, MN (US); David LeRoy Johnson, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 10/758,483

(22) Filed: Jan. 15, 2004

(65) Prior Publication Data

US 2005/0160147 A1 Jul. 21, 2005

(51) Int. Cl.
*G06F 15/16* (2006.01)
*G06F 15/167* (2006.01)
*G06F 15/00* (2006.01)

(52) U.S. Cl. ............... 709/215; 709/203; 709/204; 709/205; 709/206; 358/1.15

(58) Field of Classification Search ......... 709/203–206, 709/207, 215; 358/400, 401, 402, 407, 1.15; 705/1, 34, 40, 410; 715/752
See application file for complete search history.

(56) References Cited

U.S. PATENT DOCUMENTS

| | | | | |
|---|---|---|---|---|
| 5,805,810 | A * | 9/1998 | Maxwell | 709/206 |
| 6,285,777 | B2 * | 9/2001 | Kanevsky et al. | 382/101 |
| 6,604,132 | B1 * | 8/2003 | Hitt | 709/206 |
| 6,609,138 | B1 | 8/2003 | Merriam | |
| 6,697,843 | B1 * | 2/2004 | Carlin et al. | 709/206 |
| 7,333,223 | B2 * | 2/2005 | Gupton et al. | 358/1.15 |
| 6,897,973 | B1 * | 5/2005 | Brookner et al. | 358/1.15 |
| 2001/0049745 | A1 * | 12/2001 | Schoeffler | 709/238 |
| 2002/0092276 | A1 * | 7/2002 | Chang et al. | 53/494 |
| 2002/0107930 | A1 * | 8/2002 | Itoh | 709/206 |
| 2003/0110223 | A1 * | 6/2003 | Hamilton et al. | 709/206 |
| 2003/0229632 | A1 * | 12/2003 | Harris | 707/3 |
| 2004/0054732 | A1 * | 3/2004 | Carter et al. | 709/206 |
| 2006/0031296 | A1 * | 2/2006 | Wibeck | 709/206 |

OTHER PUBLICATIONS

Stamps.com: Postage From Your Printer. Mail and Ship from Home or Office, http://www.stamps.com/postage/tour/step1/?Rx7Tu, 1998-2003, p. 1 of 1.
Stamps.com, http://www.stamps.com/postage/tour/3-postage/popup, Dec. 18, 2003, p. 1 of 1.

* cited by examiner

*Primary Examiner*—Nathan J. Flynn
*Assistant Examiner*—Joshua Joo
(74) *Attorney, Agent, or Firm*—Owen J. Gamon

(57) ABSTRACT

A method, apparatus, system, and signal-bearing medium that in an embodiment convert e-mail into physical mail. In various embodiments, if a recipient identifier in the e-mail is an e-mail address, the recipient identifier is retained. But, if the recipient identifier in the e-mail is not an e-mail address, the recipient identifier, or a street address associated with the recipient identifier, is printed on an envelope, and the e-mail is also printed. Postage may also optionally be printed on the envelope. In this way, persons who do not have an e-mail address may still receive the contents of e-mail via physical delivery.

10 Claims, 5 Drawing Sheets

E-MAIL TO PHYSICAL MAIL CONVERTER

FIELD

An embodiment of the invention generally relates to electronic mail. In particular, an embodiment of the invention generally relates to the conversion of electronic mail to physical mail.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs.

Although computer systems were once stand-alone devices, computer systems today are increasingly connected via networks. One such network is the Internet or World Wide Web, in which electronic document transfer and message communication such as electronic mail (e-mail) are commonplace. More and more users globally are communicating via e-mail, which is considerably less expensive and more convenient than telephone calls, faxes, or letters.

Users of e-mail in the Internet are typically provided with a user e-mail address, which serves as an electronic mail box. A user is able to create an e-mail and transmit it to one or more other users via their respective user address. Messages are thus capable of being transmitted to multiple recipients, simultaneously. This is usually accomplished when the sender or originator of the e-mail enters the respective addresses of each desired recipient in a destination address location (e.g., the "To," "CC," or "BCC" fields) of the user interface provided by the e-mail application software being utilized to transmit the e-mail.

Another method of designating recipients is to send the e-mail to an automated mailing list manager that uses an application, often called a mail exploder, to turn a single alias for a distribution list into a series of individual mail addresses. The mailing list manager may also forward the e-mail to a storage space dedicated to the distribution list on a post office server and accessible by all client members of the list. The post office server then notifies the respective clients that a message is being retained. Mailing list managers such as listserv, listproc, and majordomo allow a client to subscribe or unsubscribe to a given mailing list.

Due to the pervasiveness of e-mail correspondence, an e-mail distribution list can contain hundreds or even thousands of recipients. Yet, despite the seeming universal nature of computers, many people still do not have computers and thus cannot receive e-mail or participate in e-mail distribution lists. These people still rely on post office mail or other physical delivery services to their street addresses. But, senders of e-mail seldom take the time to manually print off a copy of the e-mail, address an envelope, affix the proper postage, and drop the envelope in a mail box.

Without a more convenient way to send e-mails to street addresses, persons without an e-mail address or without access to a computer will continue to be unable to enjoy the benefits of e-mail.

SUMMARY

A method, apparatus, system, and signal-bearing medium are provided that in an embodiment convert e-mail into physical mail. In various embodiments, if a recipient identifier in the e-mail is an e-mail address, the recipient identifier is retained. But, if the recipient identifier in the e-mail is not an e-mail address, the recipient identifier, or a street address associated with the recipient identifier, is printed on an envelope, and the e-mail is also printed. Postage may also optionally be printed on the envelope. In this way, persons who do not have an e-mail address may still receive the contents of e-mail via physical delivery.

DETAILED DESCRIPTION

Figure 1:
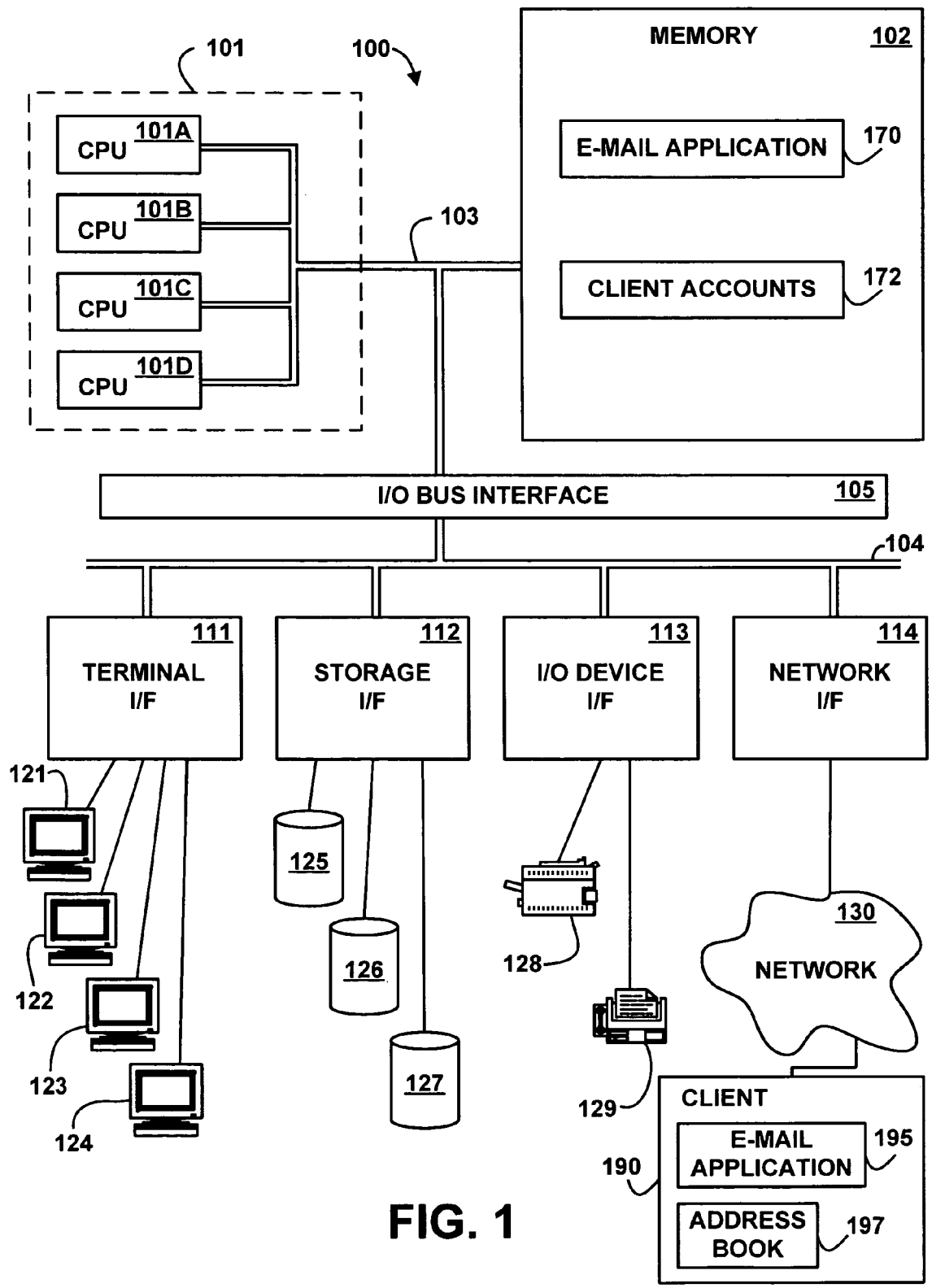
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors.

Memory may further be distributed and associated with different CPUs or sets of CPUs, as is known in any of various so-called non-uniform memory access (NUMA) computer architectures.

The memory 102 includes an e-mail application 170 and client accounts data 172. Although the e-mail application 170 and the client accounts data 172 are illustrated as being contained within the memory 102 in the computer system 100, in other embodiments one or both of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the e-mail application 170 and the client accounts data 172 are illustrated as residing in the memory 102, these elements are not necessarily all completely contained in the same storage device at the same time.

The e-mail application 170 controls the sending and receiving of e-mail to/from the computer system 100. The transportation and delivery of e-mail messages can be divided into two categories. The first category is the submission and receipt of messages between a client and an e-mail post office. The second category is the routing of e-mail messages from one post office to another. In various embodiments, the e-mail application 170 may support either or both of the categories.

There are currently two Internet standards for the submission and receipt of e-mail messages between a client and a post office. One standard is known as "Post Office Protocol version 3" ("POP3") and the other is known as "Internet Message Access Protocol version 4 revision 1" ("IMAP4rev1"). In various embodiments, the e-mail application 170 may support either or both of the standards or any other appropriate standard.

POP3 allows a client to connect to a post office server in order to check for new e-mail messages in the client's mail account and to read header information. In order for a client to read an e-mail message using the POP3 standard, the client needs to download the message to a local directory.

IMAP4rev1 differs from POP3 in the sense that a client does not need to download an e-mail message to the client's local directory from the post office server in order to read it. IMAP4rev1 allows a client to perform all of the client's mailbox functions with the message retained on the post office server. When a post office receives a message for a given client, it is stored in a database in encrypted form in a mailbox designated for the client. The client is then notified that there is a new message. A configuration with all client mailboxes located on one post office server has the advantage of allowing an administrator to perform tasks associated with managing the server, including the deletion of old messages.

In an embodiment, the e-mail application 170 includes instructions capable of executing on the processor 101 or statements capable of being interpreted by instructions executing on the processor 101 to perform the functions as further described below with reference to FIG. 5. In another embodiment, the e-mail application 170 may be implemented in microcode. In yet another embodiment, the e-mail application 170 may be implemented in hardware via logic gates and/or other appropriate hardware techniques, in lieu of or in addition to a processor-based system.

The client accounts 172 may include data about the client 190, such as the amount of money available to pay for postage or other delivery fees. The e-mail application 170 may administer the client accounts data 172, as further described below with reference to FIG. 5.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). Portions of the contents of the storage devices 125, 126, and 127 may be transferred to the main memory 102, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN).

In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The client 190 is connected to the network 130. The client 190 includes an e-mail application 195 and an address book 197. The e-mail application 195 controls the sending and receiving of e-mail to/from the client 190. The functions of the e-mail application 195 are further described below with reference to FIGS. 3 and 4. The e-mail application 195 may include some or all of the functions of the e-mail application 170, as previously described above. The e-mail application 195 may further include instructions capable of being executed on an unillustrated processor in the client 190, statements capable of being interpreted by instructions executing on the unillustrated processor, or may be implemented in microcode or hardware.

The address book 197 may include names and contact information for potential recipients of e-mails. The address book 197 is further described below with reference to FIG. 2. The client 190 may further include hardware components (not shown) analogous to some or all of the elements previously described above for the computer system 100. Although only one client 190 is illustrated, in other embodiments any number of clients may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100 and/or the client 190, and that, when read and executed by one or more processors 101 in the computer system 100 and/or the client 190, cause the computer system 100 and/or the client 190 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 and/or the client 190 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
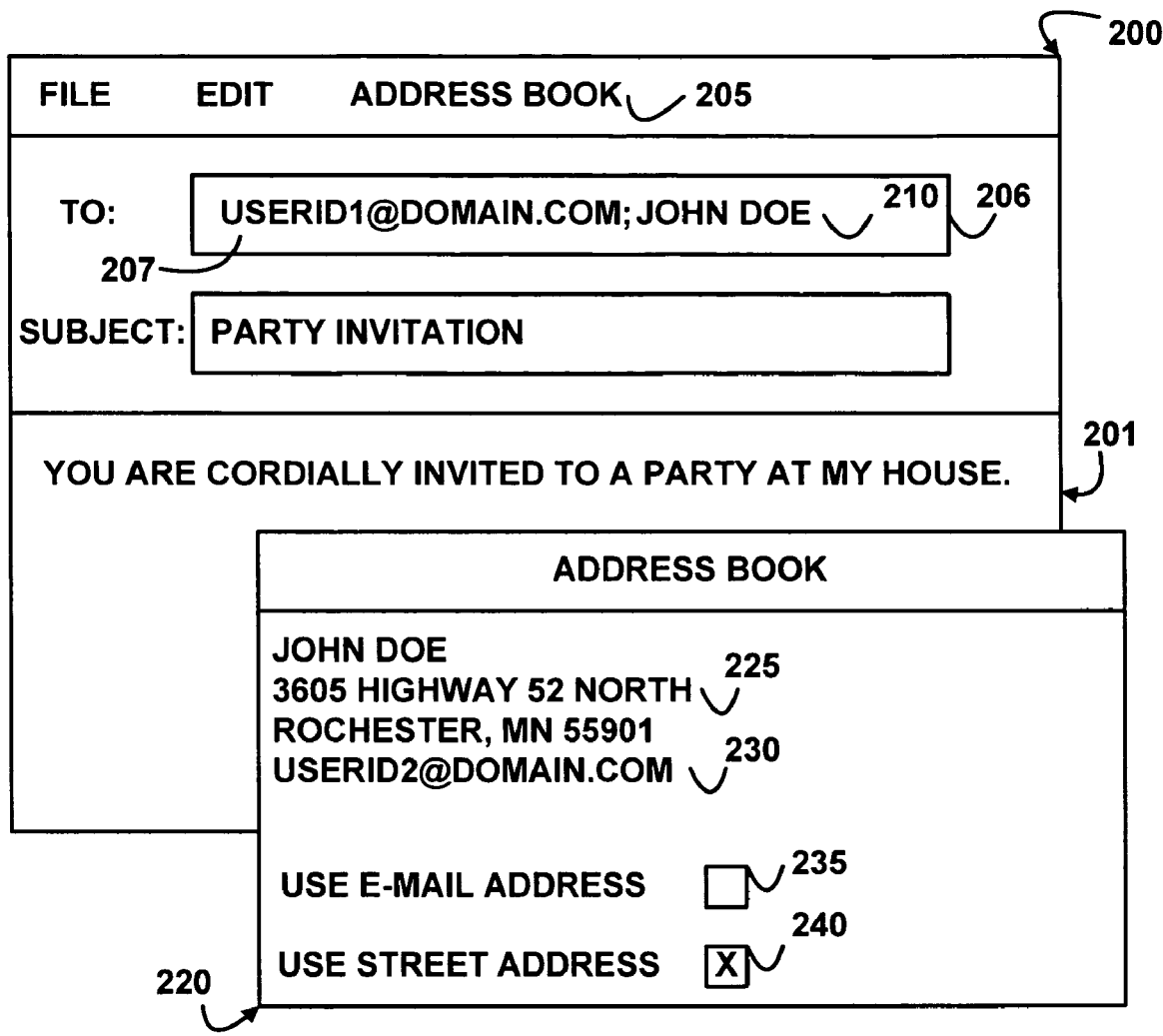
FIG. 2 depicts a pictorial representation of an example user interface, according to an embodiment of the invention.

FIG. 2 depicts a pictorial representation of an example user interface 200, which is displayed by the e-mail application 195, according to an embodiment of the invention. The user interface 200 includes an example e-mail 201. The e-mail 201 includes a destination address field 206. The destination address field 206 includes recipient identifiers 207 and 210, which indicate the intended recipients of the e-mail. The recipient identifier 207 is a user e-mail address. The recipient identifier 210 is a name, which is not a user e-mail address, but in another embodiment the recipient identifier 210 may be a partial name or an identifier of a distribution list. Although the destination address field 206 is illustrated as being a "To:" field, in other embodiments, the destination address field 206 may be a "CC" (carbon copy) field, a "BCC" (blind carbon copy) field, or any other appropriate type of destination address field.

When the user selects the address book option 205 in the user interface 200, the e-mail 195 displays entries from the address book 197 (FIG. 1), such as the address book entry 220. The address book entry 220 may include a street address 225, a e-mail address 230, a use e-mail address option 235, and a use street address option 240, but in other embodiments, the address book entry 220 may include a fax number, mobile phone number, or any other appropriate data. The street address 225 identifies a postal address or other physical location, such as a street number, street name, city, state, and zip code. In other embodiments, the street address 225 may also include a region, zone, country, or any other appropriate identifier.

The use e-mail address option 235 allows the specification that e-mails intended for this recipient are to be delivered via e-mail to the e-mail address 230. The use street address option 240 allows the specification that e-mails intended for this recipient are to be delivered via physical means to the street address 225 or to a street address that is part of the recipient identifier.

The user interface elements and data displayed in FIG. 2 are exemplary only. In other embodiments, different, more, and/or fewer elements and data may be present.

Figure 3:
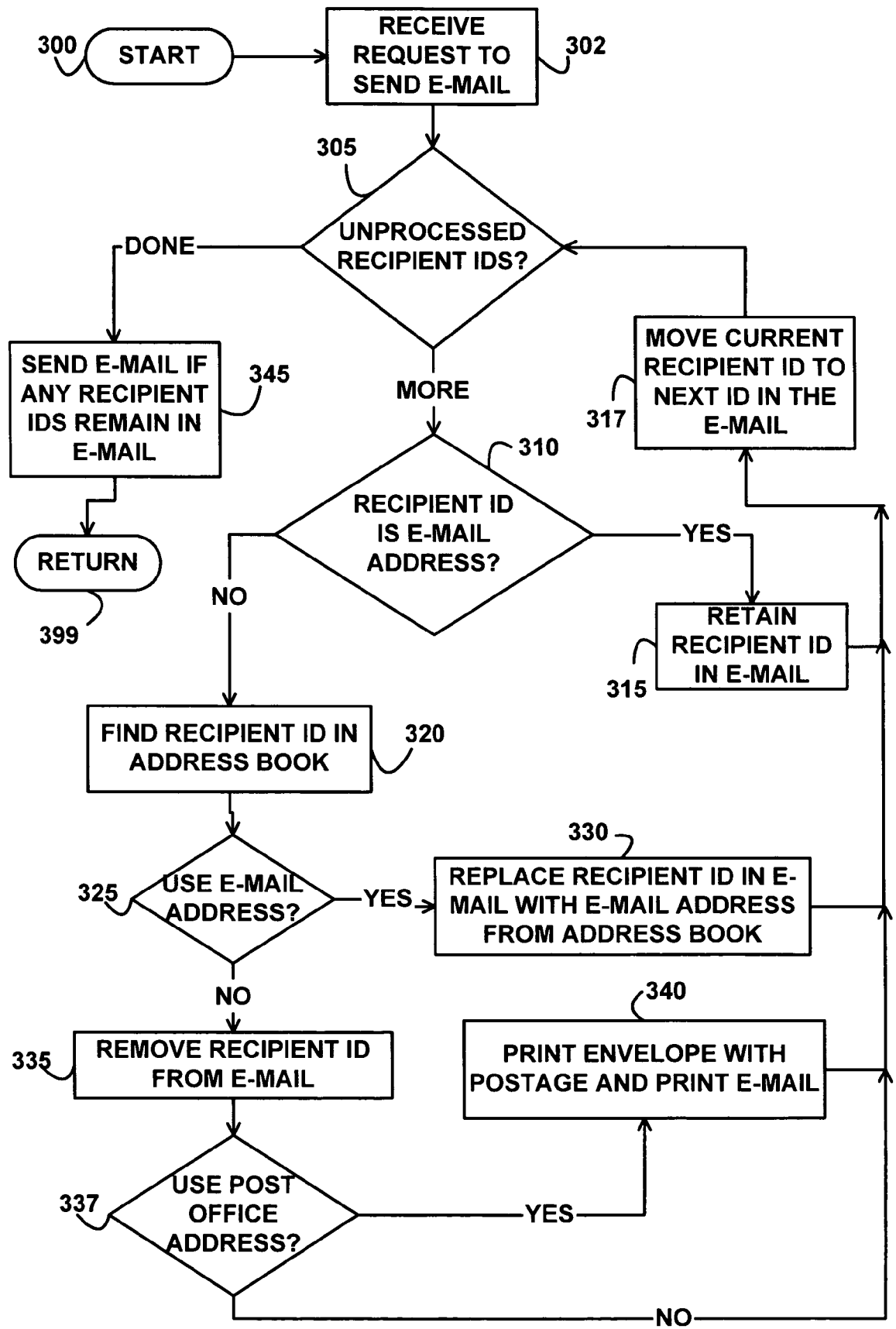
FIG. 3 depicts a flowchart of example processing for an e-mail application at a client, according to an embodiment of the invention.

FIG. 3 depicts a flowchart of example processing for the e-mail application 195 at the client 190, according to an embodiment of the invention. Control begins at block 300. Control then continues to block 302 where the e-mail application 195 receives a request via the user interface 200 to send an e-mail. Control then continues to block 305 where the e-mail application 195 determines whether there are any recipient identifiers in the destination address field 206 (FIG. 2) of the e-mail left unprocessed by the logic of FIG. 3.

If the determination at block 305 indicates there are more recipient identifiers to process, then control continues from block 305 to block 310 where the e-mail application 195 determines whether the current recipient identifier is an e-mail address. If the determination at block 310 is true, then the current recipient identifier is an e-mail address (e.g., the recipient identifier 207 in FIG. 2), so control continues to block 315 where the e-mail application 195 retains the current recipient identifier in the header of the e-mail. A standard feature of e-mail messages is the presence of a "header." The header portion of an e-mail message typically contains information about the source of the message, its subject, and its destination. Control then continues to block 317 where the e-mail application 195 moves the current recipient identifier to the next recipient identifier in the e-mail. Control then returns to block 305, as previously described above.

If the determination at block 310 is false, then the current recipient identifier is not an e-mail address (e.g., the recipient identifier 210 in FIG. 2), so control continues to block 320 where the e-mail application 195 searches for the current recipient identifier in the address book 197. Control then continues to block 325 where the e-mail application determines whether the current recipient identifier is found in the address book 197 (e.g., the entry 220), the entry includes an e-mail address (e.g., the e-mail address 230), and the entry indicates that the e-mail address is to be used (e.g., via the use e-mail address field 235). If the determination at block 325 is true, then control continues to block 330 where the e-mail application 195 replaces the current recipient identifier in the header of the e-mail with the e-mail address from the address book entry (e.g., the e-mail address 230 in the entry 220). Control then continues to block 317, as previously described above.

If the determination at block 325 is false, then control continues to block 335 where the e-mail application 195 removes the current recipient identifier from the e-mail.

Control then continues to block 337 where the e-mail application 195 determines whether to use the street address via the user interface element 240. If the determination at block 337 is true, then the user has requested that the street address be used, so control continues to block 340 where the e-mail application 195 prints an envelope using the street address associated with the current recipient identifier (e.g., the street address 225), optionally affixes proper postage to the envelope, and prints the e-mail. In an embodiment, the e-mail application 195 affixes proper postage by printing postage on the envelope via E-stamp or any other appropriate mechanism. In another embodiment, the recipient identifier in the e-mail includes the street address, that is, the user enters the street address in the destination address field 206. The printed e-mail and envelope may then be deposited with a postal service or any other appropriate delivery service. Control then continues to block 317, as previously described above.

If the determination at 337 is false, then the user has requested that the street address not be used, so control returns to block 317 as previously described above.

If the determination at block 305 indicates there are not more recipient identifiers in the e-mail to process, then control continues from block 305 to block 345 where the e-mail application 195 sends the e-mail to the server 100 if any user e-mail addresses remain in the e-mail. In another embodiment, the e-mail application 195 sends the e-mail to the recipients, if any, that remain in the header of the e-mail. Control then continues to block 399 where the logic of FIG. 3 returns.

Figure 4:
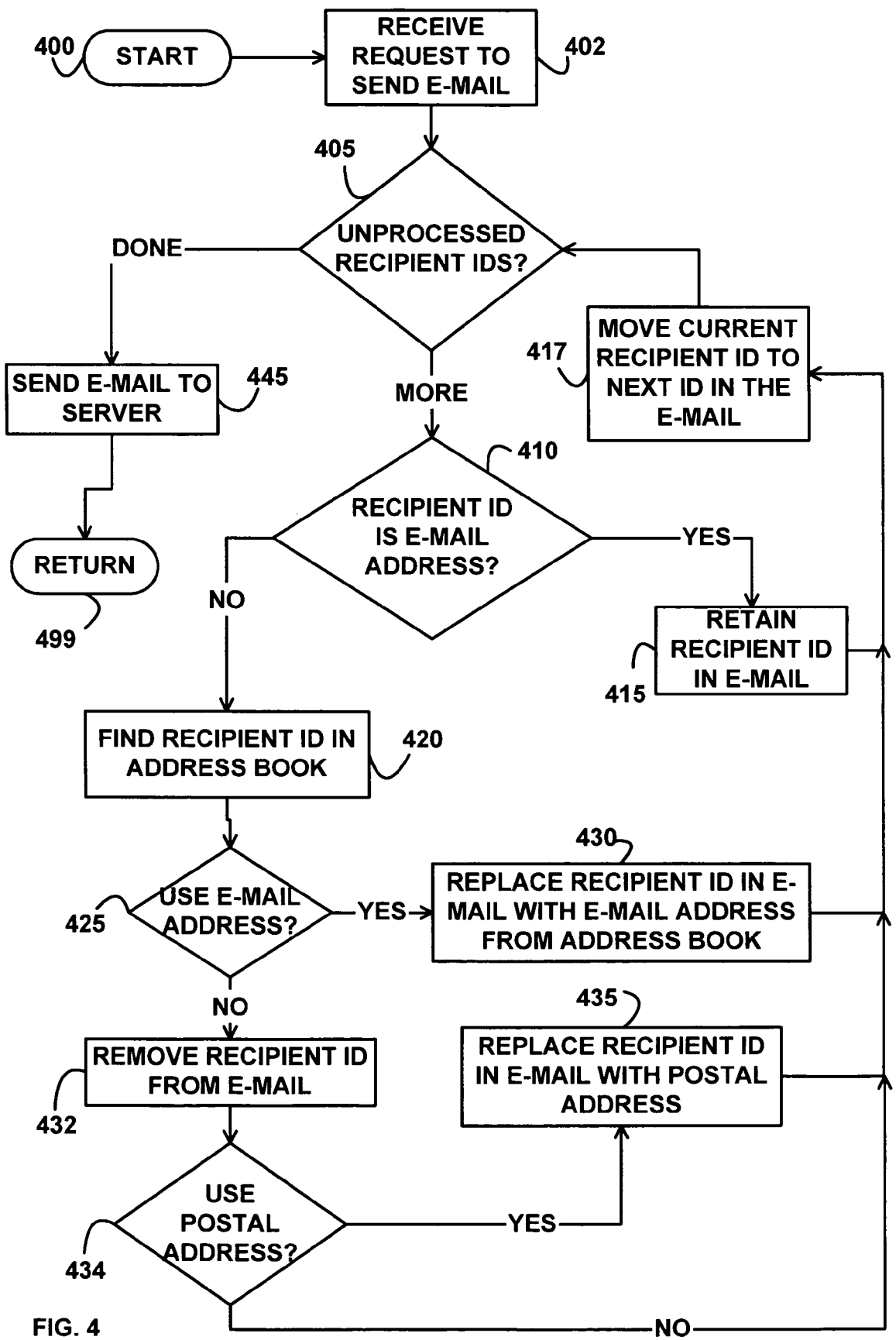
FIG. 4 depicts a flowchart of example processing for an e-mail application at a client, according to another embodiment of the invention.

FIG. 4 depicts a flowchart of example processing for the e-mail application 195 at the client 190, according to another embodiment of the invention. Control begins at block 400. Control then continues to block 402 where the e-mail application 195 receives a request via the user interface 200 to send an e-mail. Control then continues to block 405 where the e-mail application 195 determines whether there are any recipient identifiers in the destination address field 206 (FIG. 2) of the e-mail left unprocessed by the logic of FIG. 4.

If the determination at block 405 indicates there are more recipient identifiers to process, then control continues from block 405 to block 410 where the e-mail application 195 determines whether the current recipient identifier is an e-mail address. If the determination at block 410 is true, then the current recipient identifier is an e-mail address (e.g., the recipient identifier 207 in FIG. 2), so control continues to block 415 where the e-mail application 195 retains the current recipient identifier in the header of the e-mail. A standard feature of e-mail messages is the presence of a "header." The header portion of an e-mail message typically contains information about the source of the message, its subject, and its destination. Control then continues to block 417 where the e-mail application 195 moves the current recipient identifier to the next recipient identifier in the e-mail. Control then returns to block 405, as previously described above.

If the determination at block 410 is false, then the current recipient identifier is not an e-mail address (e.g., the recipient identifier 210 in FIG. 2), so control continues to block 420 where the e-mail application 195 searches for the current recipient identifier in the address book 197. Control then continues to block 425 where the e-mail application determines whether the current recipient identifier is found in the address book 197 (e.g., the entry 220), the entry includes an e-mail address (e.g., the e-mail address 230), and the entry indicates that the e-mail address is to be used (e.g., via the use e-mail address field 235). If the determination at block 425 is true, then control continues to block 430 where the e-mail application 195 replaces the current recipient identifier in the header of the e-mail with the e-mail address from the address book entry (e.g., the e-mail address 230 in the entry 220). Control then continues to block 417, as previously described above.

If the determination at block 425 is false, then control continues to block 432 where the e-mail application 195 removes the recipient identifier from the e-mail. Control then continues to block 434 where the e-mail application 195 determines whether to use the street address via the user interface element 240. If the determination at block 434 is true, then control continues to block 435 where the e-mail application 195 replaces the current recipient identifier in the e-mail with a postal address or a physical street address, such as the street address 230 in the address book 197. In another embodiment, the physical street address may be part of the recipient identifier in the destination address field 206, so the e-mail application 195 retains the recipient identifier in the header of the e-mail. Control then continues to block 417, as previously described above.

If the determination at block 434 is false, then control returns to block 417, as previously described above.

If the determination at block 405 indicates there are no more recipient identifiers in the e-mail to process, then control continues from block 405 to block 445 where the e-mail application 195 sends the e-mail to the server 100. Control then continues to block 499 where the logic of FIG. 4 returns.

Figure 5:
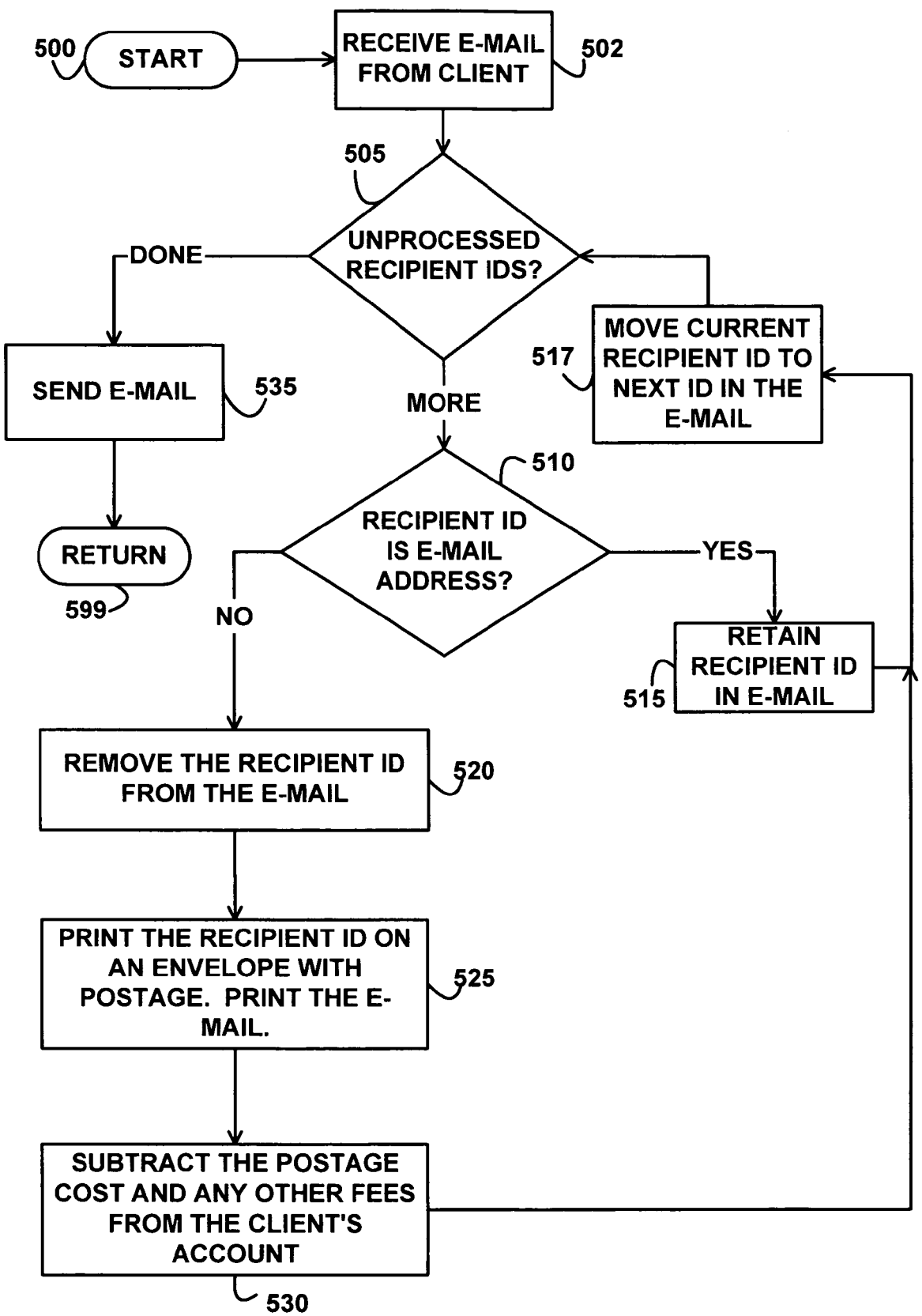
FIG. 5 depicts a flowchart of example processing for an e-mail application at a server, according to an embodiment of the invention.

FIG. 5 depicts a flowchart of example processing for the e-mail application 170 at the server 100, according to an embodiment of the invention. Control begins at block 500. Control then continues to block 502 where the e-mail application 170 receives an email from the client 190. Control then continues to block 505 where the e-mail application 170 determines whether there are any recipient identifiers in the destination address field 206 (FIG. 2) of the e-mail left unprocessed by the logic of FIG. 5.

If the determination at block 505 indicates there are more recipient identifiers to process, then control continues from block 505 to block 510 where the e-mail application 170 determines whether the current recipient identifier is an e-mail address. If the determination at block 510 is true, then the current recipient identifier is an e-mail address (e.g., the recipient identifier 207 in FIG. 2), so control continues to block 515 where the e-mail application 170 retains the current recipient identifier in the header of the e-mail. A standard feature of e-mail messages is the presence of a "header." The header portion of an e-mail message typically contains information about the source of the message, its subject, and its destination. Control then continues to block 517 where the e-mail application 170 moves the current recipient identifier to the next recipient identifier in the e-mail. Control then returns to block 505, as previously described above.

If the determination at block 510 is false, then the current recipient identifier is not an e-mail address (e.g., the recipient identifier 210 in FIG. 2), so control continues to block 520 where the e-mail application 170 removes the current recipient identifier from the e-mail. Control then continues to block 525 where the e-mail application 170 prints an envelope using the recipient identifier, which is the postal address or street address, optionally affixes proper postage to the envelope, and prints the e-mail. In an embodiment, the e-mail application 170 affixes proper postage via E-stamp or any other appropriate mechanism. The printed e-mail and envelope may then be deposited with a postal service or any other appropriate delivery service.

Control then continues to block 530 where the e-mail application 170 subtracts the postage cost and/or other fees from the client account 172. In another embodiment, the e-mail application 170 presents a confirmation message to the user prior to subtracting the cost of the postage from the client's account. In another embodiment, the e-mail application 170 presents a confirmation message to the user after the total cost for the e-mail has been calculated, but before sending the e-mail. Control then continues to block 517, as previously described above.

If the determination at block 505 indicates that there are no more recipient identifiers in the e-mail to process, then control continues from block 505 to block 535 where the e-mail application 170 sends the e-mail to the designated recipients that remain in the header of the e-mail, if any. Control then continues to block 599 where the logic of FIG. 5 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   receiving by an e-mail application an e-mail from a client, wherein the e-mail comprises at least one recipient identifier, wherein the at least one recipient identifier identifies an intended recipient of the e-mail;
   determining by the e-mail application whether each recipient identifier including the at least one recipient identifier in the e-mail that identifies the intended recipient of the e-mail comprises an e-mail address;
   in response to the determining, for the each recipient identifier in the e-mail:
   if a recipient identifier does not comprise an e-mail address, removing the recipient identifier that does not comprise an e-mail address from the e-mail, printing the e-mail, printing postage on an envelop, printing a street address associated with the recipient identifier on the envelop, and subtracting a cost of the postage from an account associated with an originator of the e-mail; and
   if a recipient identifier does comprise an e-mail address, retaining the recipient identifier comprising the e-mail address in the email;
   wherein the removing, the printing of the postage, the printing of the street address, the subtracting, and the retaining are performed by the email application; and
   sending by the e-mail application the e-mail to recipient identifiers retained in the e-mail if any recipient identifier comprising an e-mail address is retained in the e-mail after the determining and the removing.

2. The method of claim 1, further comprising:
   obtaining the street address from an address book, wherein an entry in the address book is associated with the recipient identifier.

3. The method of claim 1, wherein the recipient identifier comprises the street address.

4. The method of claim 2, further comprising:
   determining whether to perform the removing, the printing the e-mail, and the printing the street address based on an option associated with the address book.

5. A storage medium encoded with instructions, wherein the instructions perform steps comprising of:
receiving by an e-mail application an e-mail from a client, wherein the e-mail comprises at least one recipient identifier, wherein the at least one recipient identifier identifies an intended recipient of the e-mail;
determining by the e-mail application whether each recipient identifier including the at least one recipient identifier in the e-mail that identifies the intended recipient of the e-mail comprises an e-mail address;
in response to the determining, for the each recipient identifier in the e-mail:
if a recipient identifier does not comprise an e-mail address, removing the recipient identifier that does not comprise an e-mail address from the e-mail, printing the e-mail, printing postage on an envelop, printing a street address associated with the recipient identifier on the envelop, and subtracting a cost of the postage from an account associated with an originator of the e-mail; and
if a recipient identifier does comprise an e-mail address, retaining the recipient identifier comprising the e-mail address in the email;
wherein the removing, the printing of the postage, the printing of the street address, the subtracting, and the retaining are performed by the email application; and
sending by the e-mail application the e-mail to recipient identifiers retained in the e-mail if any recipient identifier comprising an e-mail address is retained in the e-mail after the determining and the removing.

6. The storage medium of claim 5, further comprising:
obtaining the street address from an address book, wherein an entry in the address book is associated with the recipient identifier.

7. The storage medium of claim 5, wherein the recipient identifier comprises the street address.

8. A computer system comprising:
a processor; and
memory encoded with instructions, wherein the instructions execute steps comprising of:
receiving by an e-mail application an e-mail from a client, wherein the e-mail comprises at least one recipient identifier, wherein the at least one recipient identifier identifies an intended recipient of the e-mail;
determining by the e-mail application whether each recipient identifier including the at least one recipient identifier in the e-mail that identifies the intended recipient of the e-mail comprises an e-mail address;
in response to the determining, for the each recipient identifier in the e-mail:
if a recipient identifier does not comprise an e-mail address, removing the recipient identifier that does not comprise an e-mail address from the e-mail, printing the e-mail, printing postage on an envelop, printing a street address associated with the recipient identifier on the envelop, and subtracting a cost of the postage from an account associated with an originator of the e-mail, and
if a recipient identifier does comprise an e-mail address, retaining the recipient identifier comprising the e-mail address in the email;
wherein the removing, the printing of the postage, the printing of the street address, the subtracting, and the retaining are performed by the email application;
sending by the e-mail application the e-mail to recipient identifiers retained in the e-mail if any recipient identifier comprising an e-mail address is retained in the e-mail after the determining and the removing; and
determining whether to perform the removing, the printing the e-mail, and the printing the street address based on an option associated with an address book.

9. The computer system of claim 8, wherein the instructions further comprise:
obtaining the street address from the address book, wherein an entry in the address book is associated with the recipient identifier.

10. The computer system of claim 8, wherein the recipient identifier comprises the street address.

* * * * *